United States Patent [19]

Parker et al.

[11] 4,444,305
[45] Apr. 24, 1984

[54] CONVEYOR BELTING FOR HANDLING BAKERY GOODS

[75] Inventors: Roy B. Parker, Monmouth, Me.; Stephen P. Beecher, West Seneca, N.Y.

[73] Assignee: Globe International Inc., Buffalo, N.Y.

[21] Appl. No.: 349,018

[22] Filed: Feb. 16, 1982

[51] Int. Cl.³ .................. B65G 15/30; B65G 15/34
[52] U.S. Cl. ................................. 198/844; 198/847
[58] Field of Search ............... 198/847, 844, 846, 688

[56] References Cited

U.S. PATENT DOCUMENTS

| | | | |
|---|---|---|---|
| 794,402 | 7/1905 | Goldman | 198/847 |
| 869,935 | 11/1907 | Plummer | 198/847 X |
| 1,082,309 | 12/1913 | De Large | 198/847 X |
| 1,698,035 | 1/1929 | Tobey | 198/847 |
| 4,154,335 | 5/1979 | Burnett et al. | 198/847 |

FOREIGN PATENT DOCUMENTS 2757597  7/1979  Fed. Rep. of Germany ...... 198/847

OTHER PUBLICATIONS

Conveyor Belting by A. J. Sparks Co., May 1970, pp. 2 and 16.

Primary Examiner—Robert B. Reeves
Assistant Examiner—Russell D. Stormer
Attorney, Agent, or Firm—Kane, Dalsimer, Kane, Sullivan and Kurucz

[57] ABSTRACT

The disclosure is of a conveyor belting particularly useful in conveying edible dough and bakery articles made therefrom during bakery operations. The belting comprises a base of interwoven polyester yarns to which there has been needled a surface of a batt of non-woven polypropylene fibers.

1 Claim, 2 Drawing Figures

CONVEYOR BELTING FOR HANDLING BAKERY GOODS

BACKGROUND OF THE INVENTION

1. Field of the Invention

The invention relates to conveyor belting and more particularly relates to conveyor belting useful in conveying bakery goods.

2. Brief Description of the Prior Art

Representative of the state of the art are the descriptions found in the U.S. Pat. Nos. 2,199,529; 2,503,771; 2,575,813; 2,700,939; 2,791,189; and 3,608,702.

Automated bakeries utilize textile belting materials, principally woven cotton belting, for conveying dough pieces through a variety of process operations. For example, raw dough is supported upon and carried through processing operations such as thickness rolling, scoring, transfer (to and from ovens, etc.), cutting, shaping and the like on woven cotton belting. The baked article is also transferred through various operations such as counting, packaging, etc., on such belting.

In recent years, there has been a search for an improved belting, useful in bakery production lines, specifically, lighter belting has been sought to reduce energy requirements in driving the conveyor belts. Coupled with the need for lighter weight belting is a need for belting which will resist edge fraying (a common occurrence with woven cotton constructions).

The belting of the present invention is an improvement over the woven cotton belting in that it is lighter and more durable, resisting edge fraying even on misaligned conveyor apparatus.

SUMMARY OF THE INVENTION

The invention comprises a conveyor belting, useful in conveying edible dough and baked articles made therefrom, which comprises;

a base of interwoven, polyester yarns; and
a conveyor surface of a batt of non-woven, polypropylene fibers;
said batt being secured to said yarns by engagement of fibers in said batt with the yarns;
said engagement being of the character associated with needling;
said polyester and said polypropylene being of a grade acceptable for contact with edible dough and bakery products.

DETAILED DESCRIPTION OF THE PREFERRED EMBODIMENTS OF THE INVENTION

Figure 1:
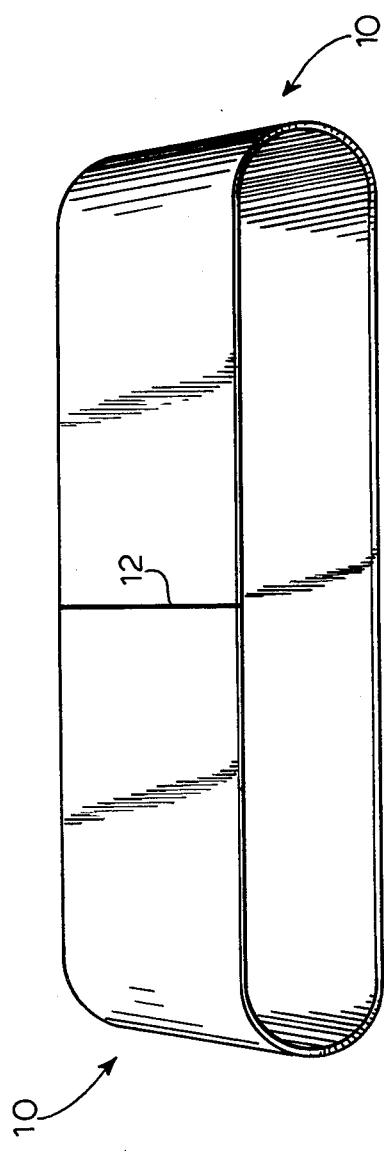
FIG. 1 is a view in perspective of an endless conveyor belt of the invention.

FIG. 1 is a view in perspective of an endless belt 10 of the invention, useful for conveying dough through bakery process operations such as thickness rolling, scoring for dimensions, dough transfer, cutting of shapes and like operations. The belt 10 may also be used to convey baked articles received from bakery ovens, in baking and packaging procedures. The belt 10 is a flat web or sheet made endless by the joinder of ends at seam 12.

The belt 10 may be employed with conventional conveyor apparatus for support and endless running.

Figure 2:
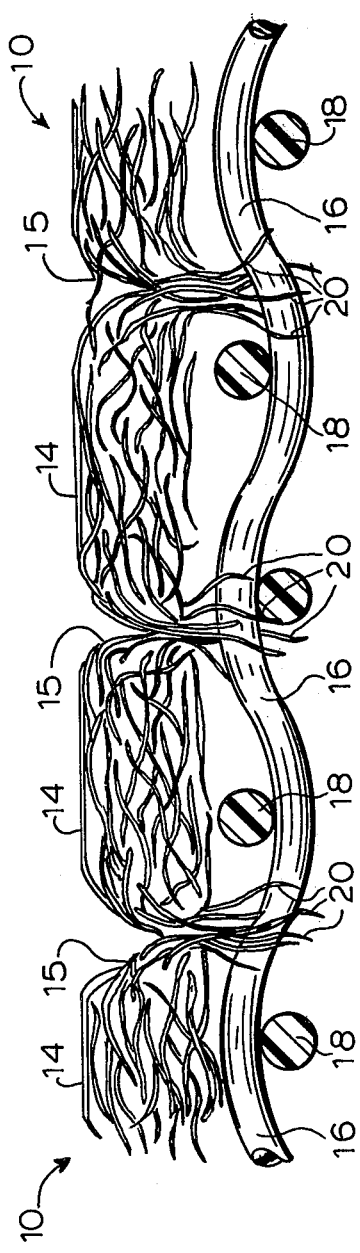
FIG. 2 is an enlarged, cross-sectional, side elevation of a portion of the belting of the invention used to make up the belt shown in FIG. 1.

FIG. 2 is an enlarged, cross-sectional, side elevation of a portion of the belt 10 as shown in FIG. 2. The belt 10 comprises a surface 14 provided by a batt of polypropylene fibers. The surface 14 together with the body of the batt of polypropylene fibers is secured to a base of interwoven machine direction yarns 16 and cross machine direction yarns 18. Securement of the polypropylene fibers to the woven yarns 16, 18 is effected by needling of the batt of polypropylene fibers to the underlying woven yarns 16, 18 so that polypropylene fibers 20 from the surface 14 layer are interengaged with the yarns 16, 18. The technique of needling is well-known and details need not be recited herein; see for example U.S. Pat. No. 2,059,132 describing conventional needling operations.

The surface 14 of the belting 10 appears to the eye to be very smooth, as is desired for conveying dough and finished bakery products. However, the greatly enlarged view provided by FIG. 2 attempts to show that the surface is actually "dimpled" with dimples 15 created by the needling procedure. These dimples or interruptions in the otherwise smooth surface 14 of the belting 10 probably enhance the release characteristics of the belting of the invention, since the belting 10 does in fact facilitate dough release from conveyed dough materials.

The polypropylene fibers employed in the surface 14 of the belt 10 may be staple fibers of a polypropylene resin which is of a grade acceptable for use in contact with edible substances. Standards for such materials are provided by many health agencies such as the U.S. Food and Drug Administration. The yarns 16, 18 may be of any conventional yarns of polyester resin material, acceptable for use in contact with edible foodstuffs also. In general, the polyester yarns will exhibit relatively low elongations at tension levels employed on conventional conveyor systems.

As mentioned above, the surface 14 of belting 10 desirably provides sufficient dough holding power to retain on its surface during processing, raw dough. However, in contradistinction it is also desirable that the surface 14 exhibit dough release properties. In a preferred embodiment belting 10 of the invention, the surface 14 is finished after the needling process.

Finishing of the surface layer 14 is advantageously carried out by singeing the surface and passing the belting 10 through a calendering procedure. Thus, after needling the belting 10 may be passed over a gas flame singer wherein the surface 14 is singed to melt, burn or otherwise remove loose fibers and "fuzz" created by loose ends of the polypropylene fibers. The exposure time of the surface 14 to the open flame of a singer may be varied and can be determined by trial and error techniques. The general technique and apparatus for singeing synthetic fabric surfaces are well-known; see for example U.S. Pat. Nos. 2,576,717; 2,677,869; 2,978,783; 3,134,158; 3,367,003; and 3,837,051. Singeing generally results in the formation of so-called "melt balls" i.e.; high volume amorphous spheres of the polypropylene resin left at the terminus of a singed fiber. These melt balls increase the coarseness of the surface 14 and may also be responsible therefore for the advantageous holding and release characteristics desired in belting 10.

After singeing, when performed, or initially when singeing is not performed it may be advantageous to calender the needled fabric of belting 10. Calendering may be accomplished employing conventional techniques and apparatus. Calendering will produce the desired level of smoothness in layer 14, abrasion resistance and insures freedom from loose fibers. Calendering is accomplished by passing the fabric of the belting 10 through the gap of opposed, heated platten rollers wherein the gap is adjusted to provide a belting 10 fabric of any desired thickness. The temperature of the plattens may be adjusted, particularly in that platten which will contact the surface layer 14 so that thermoplastic polypropylene fibers at surface 14 are fused under the heat and pressure. Optimum pressures will, of course, depend upon the particular melt characteristics of the thermoplastic resin involved. Temperatures may be selected by trial and error techniques. In general, a speed of from about 1 to 10 yards, under constant pressure of about 1500 psi and at a temperature of from about 200° to about 350° F. will suffice. The pressure specified herein is not critical so long as it is sufficient to maintain the gap range desired.

Although the embodiment described above in relation to FIGS. 1 and 2 relates to a belting 10 construction wherein a batt of polypropylene fibers is needled to the bakery goods contacting surface, those skilled in the art will appreciate that for specific purposes such as abrasion resistance, a batt of fibers may also be needled to the lower surface of the interwoven yarns 16, 18.

The following example describes the manner and process of making and using the invention and sets forth the best mode contemplated by the inventors for carrying out the invention but are not to be construed as limiting.

EXAMPLE

A woven scrim of spun polyester fiber yarns is provided, having the following make-up;

weight: 6.5–7.5 ozs/sq. yd.
warp yarn: 300 grains/100 yds.
fill yarn: 300 grains/100 yds.
fiber/denier/length: 1½ denier, 1½ inch, staple polyester
ends/inch: 17
picks/inch: 10–11
thickness: 0.067 inches
grade: FDA accepted for contact with edible materials To the scrim there is needled a non-woven batt of polypropylene fibers (3 denier, 1½ inch length, FDA acceptable for contact with edible materials). The batt has a weight of 8 ozs/sq. yd. The needled fabric is singed on the batt side on a singer (20 yds. per minute) and calendered (8 yds per minute) at platten temperatures of 320°/230° F. (front/back) to obtain a belting having:

weight: 26 ozs/sq. yd.
thickness: 0.130 inches
fiber content: 68% polypropylene, 32% polyester
elongation: 3% (25 lbs. per inch)
tensile: 200 lbs. inch minimum When made endless and installed on a bakery conveyor apparatus for carrying edible dough, the belt tracked extremely well without noticeable edge fraying. The lightweight belt exhibits low lengthwise stiffness permitting the belt to conform to the small radius of the nose bar on the conveying apparatus. In contradistinction to cotton fiber belting, no break-in period was required to provide the desired release properties (cotton fiber is oleophillic and requires a break-in period). Polypropylene fibers are naturally oleophpillic but unlike cotton fibers resist chemical degradation, especially degradation caused by the organic and mineral oils naturally present in the bakery process. Additionally, polypropylene is known for its strong oil absorbency. This property permits the belting 10 to have a naturally lubricated surface, which further contributes to the ease of dough removal. Although the belting of the above example exhibits desired dough release characteristics, there is sufficient dough holding power to permit processing through the conventional bakery set-up previously desribed. It is believed that the vertical orientation of some surface fibers due to the needling operation provides a gripping surface in the horizontal plane of the conveyor as conventionally employed in bakeries. Since dough removal from conveyor belting is normally in the vertical plane, this orientation of some of the surface fibers is not undesirable.

Other advantages of the belting produced in the above described example include an ease of splicing to make the belt endless, a lack of edge cupping (which is prevalent in woven cotton belts, requiring a selvage). Production economies are found in that wide widths can be produced and slit to the various conveyor widths desired, without edge fraying.

What is claimed:

1. A conveyor belting useful in conveying edible dough and baked articles made therefrom, which comprises;
   a base of interwoven, polyester yarns; and
   a conveyor surface of a batt of non-woven, polypropylene fibers;
   said batt being secured to said yarns by engagement of fibers in said batt with the yarns;
   said engagement being of the character associated with needling;
   said polyester and said polypropylene being of a grade acceptable for contact with edible dough and bakery products;
   said conveyor surface having been singed and calendered.

* * * * *